May 24, 1932.  F. W. GUNN  1,860,284
TOOL FOR APPLYING WIRE HOSE CLAMPS
Filed Feb. 17, 1931
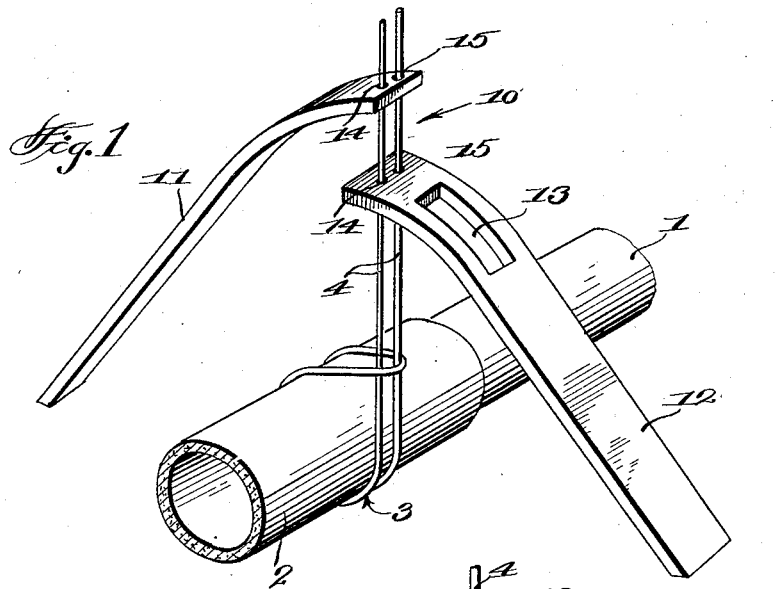
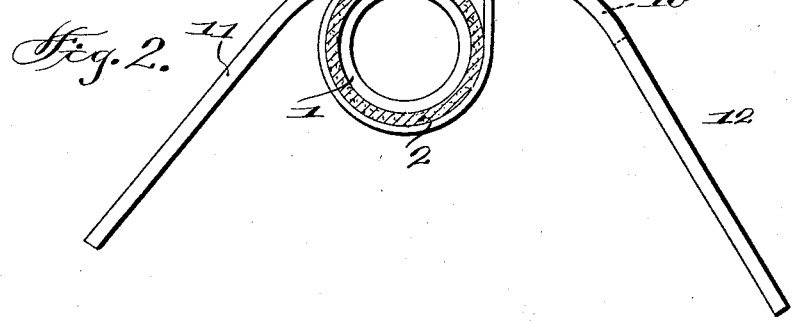
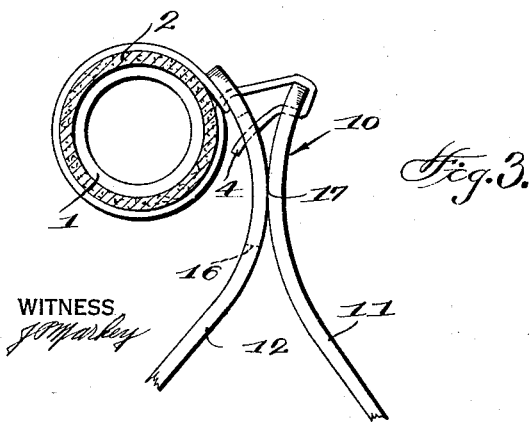
WITNESS
INVENTOR
F. W. Gunn
ATTORNEY Patented May 24, 1932

1,860,284

UNITED STATES PATENT OFFICE

FRED WILLIS GUNN, OF BOSTON, MASSACHUSETTS

TOOL FOR APPLYING WIRE HOSE CLAMPS

Application filed February 17, 1931. Serial No. 516,432.

This invention relates to wire hose clamps and more particularly to tools for applying such clamps.

The object of the invention is to provide a tool for applying wire hose clamps which is cheap, speedy and durable and which will so connect the clamp with the hose that no open spot will be left beneath the lock for leakage to occur.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 is a perspective showing this tool in the position it assumes when being applied;

Fig. 2 is a side elevation of the tool and clamp in position ready for the clamping operation, the hose being shown in transverse section; and Fig. 3 is a similar view with the tool in the position it assumes when it has completed or just time for the completion of the clamping action, the hose being shown in section.

While this tool is shown for clamping a hose to a nipple by means of a wire clamp obviously it may be used in connection with such a clamp for connecting any other two objects to which it may be adapted. The nipple 1 to which the hose 2 is shown engaged is inserted in the hose and the wire clamp 3 which is made in the form of a wire loop encircling the hose with its two ends 4 passed through the looped portion and designed to be drawn taut for clampingly connecting the hose to the nipple. To accomplish this clamping and effectively connect the two members this tool 10 is designed and it comprises two levers 11 and 12 constructed of strain resisting strips of metal each of which is curved at one end similar to a sled shoe as shown at 13 and these curved ends each are provided with laterally spaced apertures 14 and 15 through which the ends 4 of the wire clamp are designed to be passed as is shown clearly in Fig. 1.

The lever 12 is provided at its curved portion with a longitudinally extending slot-like opening 16 to permit the passing therethrough of the ends of the wire clamp when the two levers are locked together as shown in Fig. 3 to draw the loop forming the wire clamp tightly around the enclosed hose.

In the operation of this tool it will be understood that the lever 12 is first engaged with the wire ends 4 of the clamp as is shown in Fig. 1 and then above this lever the lever 11 is engaged with the ends the concave portions of the levers facing each other, it being of course understood that the clamp has been looped around the hose in the form of a noose before this tool is engaged therewith. The levers are then slid down on the wire ends 4 until they nearly contact the hose and then the lever 11 is swung over onto lever 12 with their rocking or convex faces in engagement as shown at 17 in Fig. 3, the contacting curved portions of the levers operating as a fulcrum for lever 11 which when forced down draws the wire ends 4 tightly through the loop of the clamp and the free ends 4 of the wire will pass through the opening 13 in lever 12 and be out of the way during the clamping operation.

After the clamp has been securely locked on the hose the levers of course are disengaged from the ends 4 by slipping said ends out of the apertures 14 and 15 and the bent end may be more closely forced against the hose if desired to prevent them engaging surrounding objects.

It will thus be seen that this simple little tool which may be cheaply constructed is easily applicable to the ordinary wire clamp and will quickly and effectively bend the members thereof to secure the parts of the hose or other object and the part to which it is to be secured.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

1. A tool of the class described comprising a pair of independent levers each having one end curved upwardly and apertured to receive the ends of a wire which is adapted to clamp one object to the other, one of said levers having a longitudinally extending opening adjacent said apertures to receive the ends of the wire being bent, the levers extending in opposite directions to each other and held in co-operative relation solely by the wire.

2. A tool of the class described comprising a pair of levers each having one end curved upwardly, said curved ends being apertured to receive an object to be clamped thereby, one of said levers having a longitudinal opening adjacent the end thereof in rear of the article engaging aperture, said levers being designed to be engaged with the article by said apertures and to be positioned with their rounded portions engaging whereby one forms a fulcrum for the other.

FRED WILLIS GUNN.